United States Patent [19]

Morgan et al.

[11] Patent Number: 4,862,698

[45] Date of Patent: Sep. 5, 1989

[54] METHOD AND APPARATUS FOR TESTING FOR REFRIGERANT LEAKS

[76] Inventors: Phillip Morgan, 3950 Brunswick Rd., Memphis, Tenn. 38134; David Zellers, 1752 Forrest Dr., Southaven, Miss. 38671

[21] Appl. No.: 215,807

[22] Filed: Jul. 6, 1988

[51] Int. Cl.[4] ............................................. G01M 3/00
[52] U.S. Cl. ........................................ 62/77; 62/125; 219/330
[58] Field of Search ................. 62/125, 298, 299, 430, 62/77, 238.1, 238.6; 236/23, 24; 122/504, 448 R; 219/330, 333, 296, 299, 310, 323, 328, 337

[56] References Cited

U.S. PATENT DOCUMENTS

| | | | |
|---|---|---|---|
| 2,091,838 | 8/1937 | Staak | 219/310 X |
| 2,583,814 | 1/1952 | Burklin | 236/25 |
| 2,627,015 | 1/1953 | Hackman | 219/333 X |
| 4,249,491 | 2/1981 | Steon | 219/296 X |
| 4,480,173 | 10/1984 | Butterfield | 219/333 X |

OTHER PUBLICATIONS

McCann, "Precision Controller Keeps the Pressure on Chillers", *Air Conditioning, Heating and Refrigeration News*, Jun. 13, 1988, pp. 34-35.

*Primary Examiner*—Harry B. Tanner
*Attorney, Agent, or Firm*—Walker & McKenzie

[57] ABSTRACT

An apparatus and method to aid in detecting refrigerant leaks in a refrigerant system of the type including an air-tight system vessel, refrigerant within the system vessel, a closed loop of system piping with at least a portion thereof extending through the system vessel, and heat transfer medium flowing through the system piping. The apparatus includes an apparatus vessel for being coupled to the system piping; pump structure for pumping the heat transfer medium from the system piping, through the apparatus vessel, and back to the system piping; structure for heating the heat transfer medium within the apparatus vessel to transfer heat to the refrigerant within the system vessel when the heat transfer medium is pumped from the apparatus vessel back to the system piping and to cause the pressure of the refrigerant within the system vessel to increase; and control structure for controlling the temperature of the heat transfer medium and for controlling the increase in pressure of the refrigerant within the system vessel.

13 Claims, 1 Drawing Sheet

METHOD AND APPARATUS FOR TESTING FOR REFRIGERANT LEAKS

BACKGROUND OF THE INVENTION

1. Field of the Invention

The present invention relates, in general, to a method of and an apparatus for testing for refrigerant leaks in air conditioning systems and the like.

2. Description of the Related Art

A preliminary patentability search in Class 62, subclass 77; Class 73, subclass 52; and Class 436, subclass 3 produced Gaugler, U.S. Pat. No. 2,096,099 and Griese, U.S. Pat. No. 2,169,605. Neither of the above patents discloses or suggests the present invention.

One method now used to leak test sub-atmospheric air conditioning systems and the like for refrigerant leaks is to pressurize the system with nitrogen and use a typical "sniffing" apparatus which detects the presence of refrigerant and the like. When such a leak test has been completed, the nitrogen is purged into the atmosphere, carrying with it a slight amount of refrigerant.

Another method now used to leak test sub-atmospheric air conditioning systems and the like for refrigerant leaks is to divert hot water from a boiler into the system to transfer heat to the refrigerant in the system, causing the refrigerant pressure within the system to increase and making any leakage of the refrigerant more pronounced and easier to detect.

SUMMARY OF THE INVENTION

The present invention is directed toward providing an improved method of and apparatus for testing for refrigerant leaks. The concept of the present invention is to provide a method and apparatus in which a heat transfer medium which passes through a vessel filled with a refrigerant is heated in a controlled manner so as to transfer heat to the refrigerant, causing the pressure within the vessel to increase and making any leakage of the refrigerant more pronounced and easier to detect.

The apparatus of the present invention includes an apparatus vessel for being coupled to the system piping of a refrigerant system for allowing the heat transfer medium of the refrigerant system to flow therethrough; a pump means for pumping the heat transfer medium from the system piping, through the apparatus vessel, and back to the system piping; heat means for heating the heat transfer medium within the apparatus vessel to transfer heat to the refrigerant within the system vessel of the refrigerant system when the heat transfer medium is pumped from the apparatus vessel back to the system piping and to cause the pressure of the refrigerant within the system vessel to increase; and control means for controlling the temperature of the heat transfer medium and for controlling the increase in pressure of the refrigerant within the system vessel.

One objective of the present invention is to meet the EPA's regulations of loss of refrigerant gases into the atmosphere.

Another objective of the present invention is to prevent harmful effects (e.g., headaches, dizziness, blurred vision, nausea) to service persons from breathing refrigerant.

Another benefit of the present invention is to prevent harmful effects due to equipment located near the "chiller" of a refrigerant system such as gas fired boilers and gas fired hot water heaters (if refrigerant gas is burned by such boilers and heaters, poisonous and deadly gas will be produced).

Another benefit of the present invention is to reduce the costs of labor and refrigerant.

DESCRIPTION OF THE PREFERRED EMBODIMENT

Figure 1:
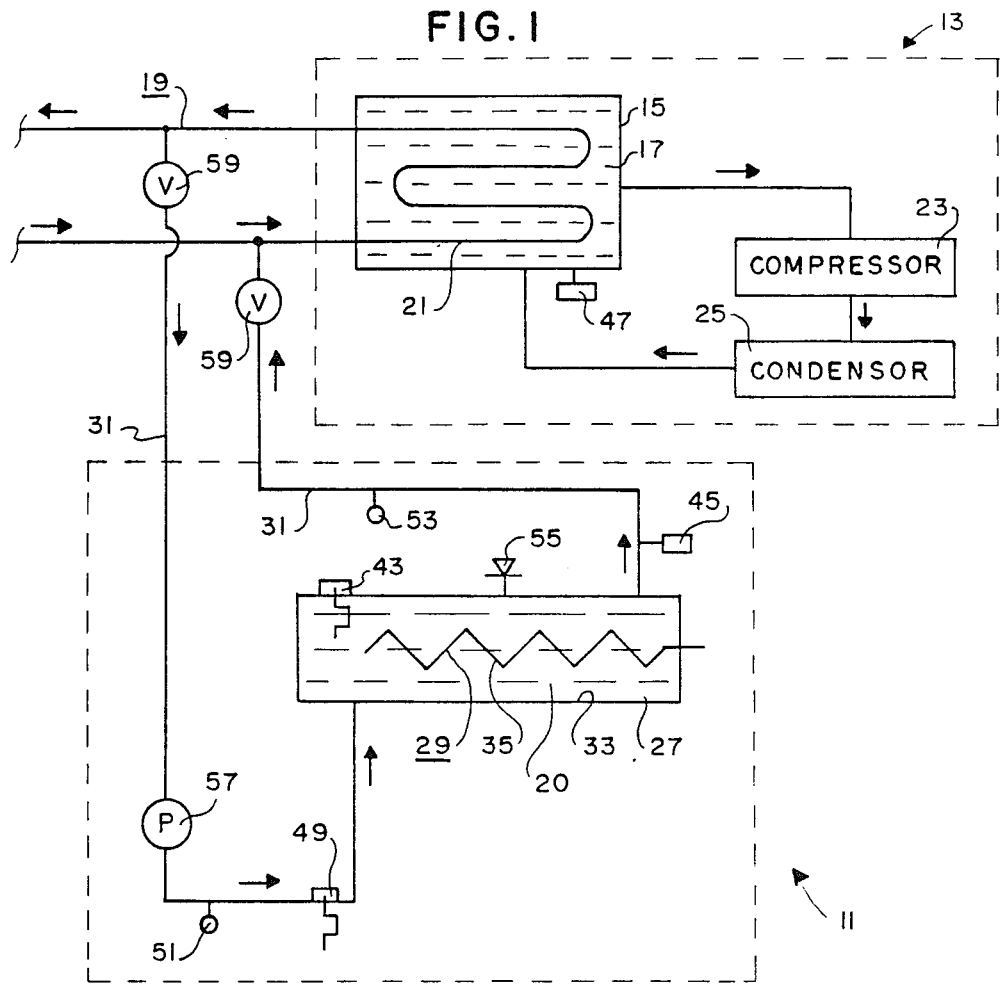
FIG. 1 is a diagrammatic view of the apparatus of the present invention shown coupled to a portion of a building air conditioning system.

The apparatus 11 of the present invention is used to aid in detecting refrigerant leaks in a refrigerant system 13 of the type including an air-tight system vessel 15, refrigerant 17 such as Freon within the system vessel 15, a closed loop of system piping 19 having a liquid heat transfer medium 20 such as water or the like therein with at least a "conditioning" portion 21 thereof (e.g., a coil) extending through the system vessel 15 in which the liquid heat transfer medium 20 is "conditioned" by the refrigerant 17, and a "transfer" portion (not shown) including a liquid heat transfer medium/air transfer means for use in cooling a roon, etc. The refrigerant system 13 may be a typical commercial air condition system wherein the system vessel 15 is commonly referred to as a "chiller evaporator" and is associated with a compressor 23 and a condenser 25 in a manner and for reasons apparent to those skilled in the art.

The apparatus 11 is preferably portable and includes an apparatus vessel 27 for being coupled to the system piping 19 for allowing the heat transfer medium 20 to flow therethrough; and includes heat means 29 for heating the heat transfer medium 20 within the apparatus vessel 27 to transfer heat to the refrigerant 17 within the system vessel 15 and to cause the pressure of the refrigerant 17 within the system vessel 15 to increase. The increase in pressure of the refrigerant 17 within the system vessel 15 will exaggerate any leak therein and will thereby aid in the detection of any leaks within the system vessel 15, etc. It should be noted that the actual testing for any such refrigerant leak may be one of various methods well known to those skilled in the art such as, for example, with typical 'sniffing' means which detect the presence of a refrigerant.

The apparatus vessel 27 preferably includes apparatus piping 31 for being coupled to the system piping 19 and for allowing the heat transfer medium 20 to flow therethrough, and preferably includes a chamber 33 coupled to the apparatus piping 31 for receiving the heat transfer medium 20. The heat means 29 is preferably associated with the chamber 33 for heating the heat transfer medium 20 within the chamber 33.

The heat means 29 preferably includes a heating element 35 extending into the chamber 33 of the apparatus vessel 27. The heating element 35 preferably includes a first electrical heating element 37 and a second electrical heating element 39. The heating elements 37, 39 may be of various typical constructions and operations as will now be apparent to those skilled in the art. The apparatus 11 preferably includes electrical circuit means 41 for selectively energizing the heating elements 37, 39.

The apparatus 11 includes control means for controlling the temperature of the heat transfer medium 20 and for controlling the increase in pressure of the refrigerant 17 within the system vessel 16. The control means preferably includes a temperature actuated switch means 43 for activating and deactivating the heating elements 37, 39 in response to the temperature of the heat transfer medium 20 within the chamber 33 of the apparatus vessel 27, a flow actuated switch means 45 for activating and deactivating the heating elements 37, 39 in response to the flow of the heat transfer medium 20 through the chamber 33 of the apparatus vessel 27, a pressure actuated switch means 47 for activating and deactivating the heating elements 37, 39 in response to the pressure of the refrigerant 17 within the system vessel 15, and a second temperature actuated switch means 49 for activating and deactivating the heating element 37, 39 in response to the temperature of the heat transfer medium 20 flowing into the chamber 33 of the apparatus vessel 27.

The control means preferably includes a first temperature gauge means 51 for indicating the temperature of the heat transfer medium 20 flowing into the chamber 33 of the apparatus vessel 27 and a second temperature gauge means 53 for indicating the temperature of the heat transfer medium 20 flowing from the chamber 33 of the apparatus vessel 27.

The control means preferably includes a relief valve means 55 associated with the chamber 33 of the apparatus vessel 27 for allowing the heat transfer medium 20 to escape from the chamber 33 of the apparatus vessel 27 if the pressure of the heat transfer medium 20 within the chamber 33 of the apparatus vessel 27 is above a predetermined amount.

The apparatus 11 includes pump means 57 for pumping the heat transfer medium 20 through the chamber 33 of the apparatus vessel 27 and valve means 59 associated with the apparatus piping 31 for controlling the flow of the heat transfer medium 20 through the apparatus piping 31.

The control means preferably includes a first relay means preferably including an electromagnetic control means 61, a first contact means 63 coupled to the control means 61 for being selectively closed by the control means 61, and a second contact means 65 coupled to the control means 61 for being selectively closed by the control means 61. The control means preferably includes a second relay means preferably including an electromagnetic control means 67, a first contact means 69 coupled to the control means 67 for being selectively closed by the control means 67, and a second contact means 71 coupled to the control means 67 for being selectively closed by the control means 67.

Figure 2:
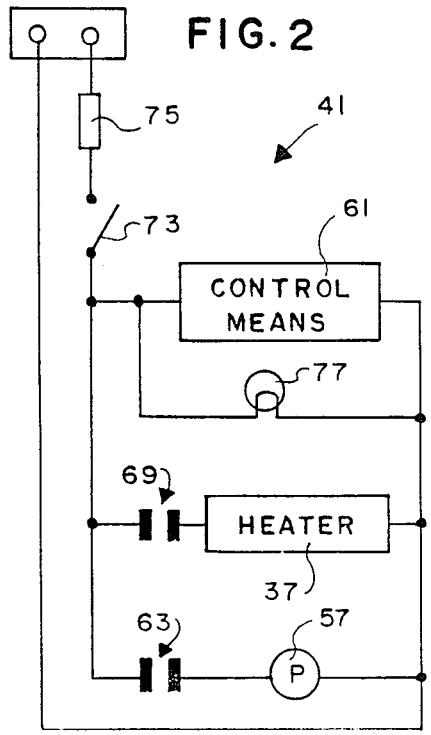
FIG. 2 is an electrical schematic of a first portion of the electric circuit of the apparatus of the present invention.
Figure 3:
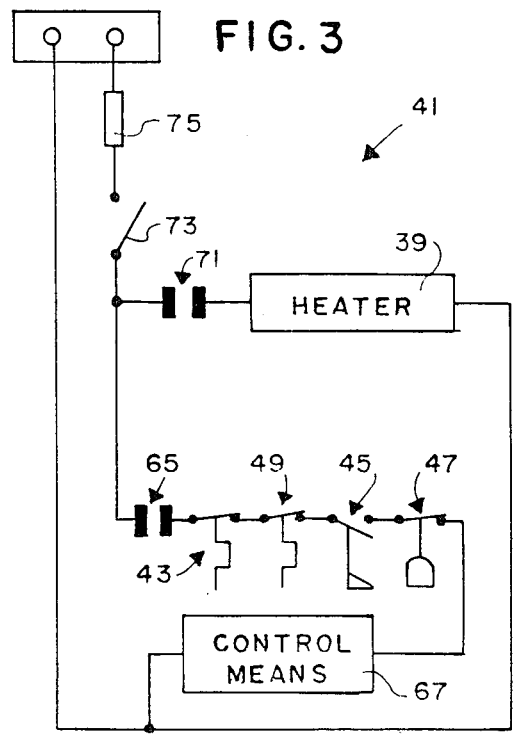
FIG. 3 is an electrical schematic of a second portion of the electric circuit of the apparatus of the present invention.

The apparatus 11 preferably includes a first electric circuit as shown in FIG. 2 and a second electric circuit as shown in FIG. 3 with each circuit controlled by a main switch 73 and protected by a fuse 75 and coupled to an electrical power supply. The first electric circuit may be provided with a pilot light 77 to indicate when it is activated. The first and second electric circuits are coupled to one another via the first and second relay means as clearly shown in FIGS. 2 and 3 with the various electrical components wired as clearly shown., The method of detecting refrigerant leaks of the present invention (and the operation of the apparatus 11) is quite simple. The apparatus vessel 27 is coupled to the system piping 19 via the apparatus piping 19. The valve means 59 are open and the pump means 57 is activated to cause the heat transfer medium 20 to be pumped through the apparatus vessel 27. The heat means 29 is activated to heat the heat transfer medium 20 within the apparatus vessel 27 and thereby transfer heat to the refrigerant 17 within the system vessel 15 whereby the pressure of the refrigerant 17 with the system vessel 15 will increase as will now be apparent to those skilled in the art. The refrigerant system 13 is then tested for refrigerant leaks in any typical manner while the control means control the temperature of the heat transfer medium 20 and the increase in pressure of the refrigerant 17 within the system vessel 15.

To summarize the opeartion of the preferred embodiment, with the valves 59 open, when the switches 73 are closed, the control means 61 will close the first contact means 63 to energize the pump means 57 and cause the medium 20 to be pumped through the apparatus piping, closing the flow actuated switch means 45, and will (with the switch means 43, 45, 47, 49 closed) close the second contact means 65 to energize the control means 67 which will, in turn, close the first and second contact means 69, 71 to energize the heating elements 37, 39.

Although the present invention has been described and illustrated with respect to a preferred embodiment and a preferred use therefor, it is not to be so limited since modifications and changes can be made therein which are within the full intended scope of the invention.

We claim:

1. An apparatus to aid in detecting refrigerant leaks in a refrigerant system of the type including an air-tight system vessel, refrigerant within said system vessel, a closed loop of system piping with at least a portion thereof extending through said system vessel, and heat transfer medium flowing through said system piping; said apparatus comprising:
   (a) an apparatus vessel for being coupled to said system piping;
   (b) pump means for pumping said heat transfer medium from said system piping, through said apparatus vessel, and back to said system piping;
   (c) heat means for heating said heat transfer medium within said apparatus vessel to transfer heat to said refrigerant within said system vessel when said heat transfer medium is pumped from said apparatus vessel back to said system piping and to cause the pressure of said refrigerant within said system vessel to increase; and
   (d) control means for controlling the temperature of said heat transfer medium and for controlling the increase in pressure of said refrigerant within said system vessel.

2. The apparatus of claim 1 in which said apparatus vessel includes apparatus piping for being coupled to said system piping and for allowing said heat transfer medium to flow therethrough, and includes a chamber coupled to said apparatus piping for receiving said heat transfer medium, said heat means being associated with said chamber for heating said heat transfer medium within said chamber.

3. The apparatus of claim 2 in which said heat means includes a heating element extending into said chamber of said apparatus vessel.

4. The apparatus of claim 3 in which said control means includes temperature actuated switch means for activating and deactivating said heating element of said heat means in response to the temperature of said heat transfer medium within said chamber of said apparatus vessel.

5. The apparatus of claim 4 in which said control means includes flow actuated switch means for activating and deactivating said heating element of said heat means in response to the flow of said heat transfer medium through said chamber of said apparatus vessel.

6. The apparatus of claim 5 in which said control means includes pressure actuated switch means for activating and deactivating said heating element of said heat means in response to the pressure of said refrigerant within said system vessel.

7. The apparatus of claim 6 in which said control means includes a second temperature actuated switch means for activating and deactivating said heating element of said heat means In response to the temperature of said heat transfer medium flowing into said chamber of said apparatus vessel.

8. The apparatus of claim 7 in which said control means includes temperature gauge means for indicating the temperature of said heat transfer medium flowing into said chamber of said apparatus vessel.

9. The apparatus of claim 8 in which said control means includes a second temperature gauge means for indicating the temperature of said heat transfer medium flowing from said chamber of said apparatus vessel.

10. The apparatus of claim 9 in which said control means includes a relief valve means associated with said chamber of said apparatus vessel for allowing said heat transfer medium to escape from said chamber of said apparatus vessel if the pressure of said heat transfer medium within said chamber of said apparatus vessel is above a predetermined amount.

11. The apparatus of claim 10 in which said control means includes valve means associated with said apparatus piping for controlling the flow of said heat transfer medium through said apparatus piping.

12. The apparatus of claim 11 in which said apparatus is portable.

13. A method of detecting refrigerant leaks in a refrigerant system of the type including an air-tight system vessel, refrigerant within said system vessel, a closed loop of system piping with at least a portion thereof extending through said system vessel, and heat transfer medium flowing through said system piping; said method comprising the steps of:
(a) pumping said heat transfer medium from said system piping to an apparatus vessel;
(b) heating said heat transfer medium within said apparatus vessel;
(c) controlling the temperature of said heat transfer medium;
(d) pumping said heat transfer medium from said apparatus vessesl to said system vessel to transfer heat to said refrigerant within said system vessel and to cause the pressure of said refrigerant within said system vessel to increase; and
(e) controlling the increase in pressure of said refrigerant within said system vessel.

* * * * *